United States Patent [19]
Filo et al.

[11] Patent Number: 6,115,477
[45] Date of Patent: Sep. 5, 2000

[54] DENTA-MANDIBULAR SOUND-TRANSMITTING SYSTEM

[75] Inventors: Andrew S. Filo, Cupertino; David G. Capper, Novato, both of Calif.

[73] Assignee: Sonic Bites, LLC, Novato, Calif.

[21] Appl. No.: 08/984,004

[22] Filed: Dec. 3, 1997

Related U.S. Application Data

[63] Continuation of application No. 08/966,401, Nov. 7, 1997, which is a continuation-in-part of application No. 08/961,647, Oct. 31, 1997, which is a continuation-in-part of application No. 08/948,715, Oct. 10, 1997.
[60] Provisional application No. 60/058,277, Sep. 9, 1997.

[30] Foreign Application Priority Data

Jan. 23, 1995 [DE] Germany ............... 195 01 859

[51] Int. Cl.⁷ .................................................. H04R 25/00
[52] U.S. Cl. ................... 381/151; 381/380; 381/326; 446/81
[58] Field of Search ...................... 381/326, 380, 381/151, 385, 74, 328, 322, 324, 327, FOR 130; 446/81, 404, 397

[56] References Cited

U.S. PATENT DOCUMENTS

| | | |
|---|---|---|
| 1,189,897 | 7/1916 | Wilkes . |
| 1,986,955 | 1/1935 | Bedell .................................. 381/151 |
| 2,799,587 | 7/1957 | Schwartz . |

(List continued on next page.)

FOREIGN PATENT DOCUMENTS

| | | |
|---|---|---|
| 0881989 | 6/1980 | Benelux TM/Des. Off. . |
| P2339543 | 2/1975 | Germany . |
| 26 29 968 | 7/1977 | Germany . |
| 30 30 132 | 3/1982 | Germany . |
| 295 14 759 | 2/1996 | Germany . |

(List continued on next page.)

OTHER PUBLICATIONS

U.S. Patent application Ser. No. 08/948,715 of Andrew S. Filo and David G. Capper for "Sound–Transmitting Amusement Device and Method" filed Oct. 10, 1997.
U.S. Patent application Ser. No. 08/961,647 of Andrew S. Filo and David G. Capper for "Sound–Transmitting Amusement Device and Method" filed Oct. 31, 1997.
U.S. Patent application Ser. No. 08/966,401 of Andrew S. Filo and David G. Capper for "Sound Recording and Playback System" filed Nov. 7, 1997.
PCT Application No. PCT/US97/21870 of Andrew S. Filo and David G. Capper for "Sound–Transmitting Amusement Device and Method" filed Nov. 26, 1997.
PCT International Search Report in PCT Application No. PCT/US97/21870 of Andrew S. Filo and David G. Capper for "Sound–Transmitting Amusement Device and Method" filed Nov. 26, 1997 (copy enclosed).

*Primary Examiner*—Huyen Le
*Attorney, Agent, or Firm*—Kolisch Hartwell Dickinson McCormack & Heuser

[57] ABSTRACT

A device for transmitting sound waves between a signal source and a user's ears, wherein the sound waves bypass the air. The invention generally comprises a signal source configured to produce signals representative of sound, and a sound-transmitting element operatively associated with the signal source to which the signal source can transmit such signals for transmission through the sound-transmitting element to a user's mouth, from which the signals are conducted by teeth and bones to the user's ears to be perceived as sound. The signal source generally comprises an source that may produce sound waves directly or indirectly with the assistance of a transducer. The sound-transmitting element generally comprises any element that may transmit signals representative of sound upon contact with a user's mouth and may include edible substances, eating utensils, and writing implements, among others. The device further may comprise an independent-selective-activity structure, a hand-manipulable structure, or an activity means that permits a user to practice a volitional function independent of sound transmission. The invention provides for the construction of a nearly limitless number of useful and novel devices.

15 Claims, 5 Drawing Sheets

U.S. PATENT DOCUMENTS

| | | |
|---|---|---|
| 2,800,825 | 7/1957 | Toussaint . |
| 2,977,425 | 3/1961 | Cole . |
| 3,122,959 | 3/1964 | Barr . |
| 3,184,587 | 5/1965 | Quijada . |
| 3,290,157 | 12/1966 | Schwartz et al. . |
| 3,627,161 | 12/1971 | Wergeland . |
| 3,875,932 | 4/1975 | Wachspress . |
| 3,985,977 | 10/1976 | Beaty et al. . |
| 4,071,110 | 1/1978 | Payne . |
| 4,150,262 | 4/1979 | Ono . |
| 4,520,238 | 5/1985 | Ikeda . |
| 4,555,697 | 11/1985 | Thackrey . |
| 4,612,915 | 9/1986 | Hough et al. . |
| 4,670,820 | 6/1987 | Eddins et al. . |
| 4,744,013 | 5/1988 | Lee et al. . |
| 4,744,124 | 5/1988 | Wang et al. . |
| 4,765,465 | 8/1988 | Yamada et al. . |
| 4,791,673 | 12/1988 | Schreiber ................................ 381/326 |
| 4,914,748 | 4/1990 | Schlotter, IV et al. . |
| 4,944,704 | 7/1990 | Grace . |
| 4,982,434 | 1/1991 | Lenhardt et al. . |
| 5,033,999 | 7/1991 | Mersky . |
| 5,079,679 | 1/1992 | Chin-Fa . |
| 5,125,866 | 6/1992 | Arad et al. . |
| 5,165,131 | 11/1992 | Staar . |
| 5,209,692 | 5/1993 | Coleman et al. . |
| 5,280,524 | 1/1994 | Norris . |
| 5,302,403 | 4/1994 | Cook et al. . |
| 5,313,557 | 5/1994 | Osterhout . |
| 5,323,468 | 6/1994 | Bottesch . |
| 5,352,470 | 10/1994 | Yang . |
| 5,391,107 | 2/1995 | Coleman . |
| 5,447,489 | 9/1995 | Issalene et al. . |
| 5,455,842 | 10/1995 | Mersky et al. . |
| 5,471,373 | 11/1995 | Coleman et al. . |
| 5,474,486 | 12/1995 | Chilton et al. . |
| 5,536,054 | 7/1996 | Liaw . |
| 5,536,196 | 7/1996 | Sternberg . |
| 5,572,762 | 11/1996 | Scheiner . |
| 5,579,284 | 11/1996 | May . |
| 5,681,200 | 10/1997 | Shecter . |
| 5,686,130 | 11/1997 | Yang . |
| 5,704,087 | 1/1998 | Strub . |
| 5,706,251 | 1/1998 | May . |
| 5,740,254 | 4/1998 | Thompson et al. ...................... 381/151 |
| 5,902,167 | 5/1999 | Filo et al. ................................ 446/81 |

FOREIGN PATENT DOCUMENTS

| | | |
|---|---|---|
| 51-94218 | 8/1976 | Japan . |
| 63-118868 | 8/1988 | Japan . |
| 4-19226 | 2/1992 | Japan . |
| 4-158812 | 6/1992 | Japan . |
| 4-66975 | 6/1992 | Japan . |
| 5-39286 | 5/1993 | Japan . |
| 6-151 | 1/1994 | Japan . |
| 8-80242 | 3/1996 | Japan . |
| 8-195994 | 7/1996 | Japan . |
| 3034501 | 2/1997 | Japan . |
| 3035669 | 3/1997 | Japan . |
| WO 88/10489 | 12/1988 | WIPO . |
| WO 94/17691 | 8/1994 | WIPO . |
| WO 95/19678 | 7/1995 | WIPO . |

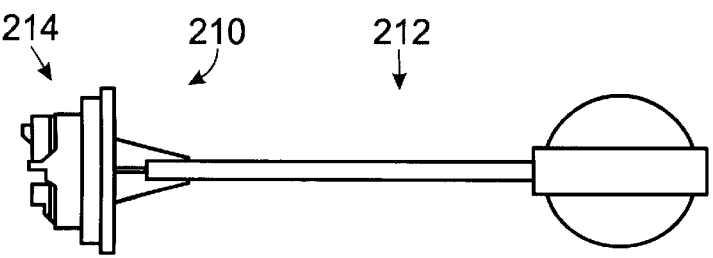
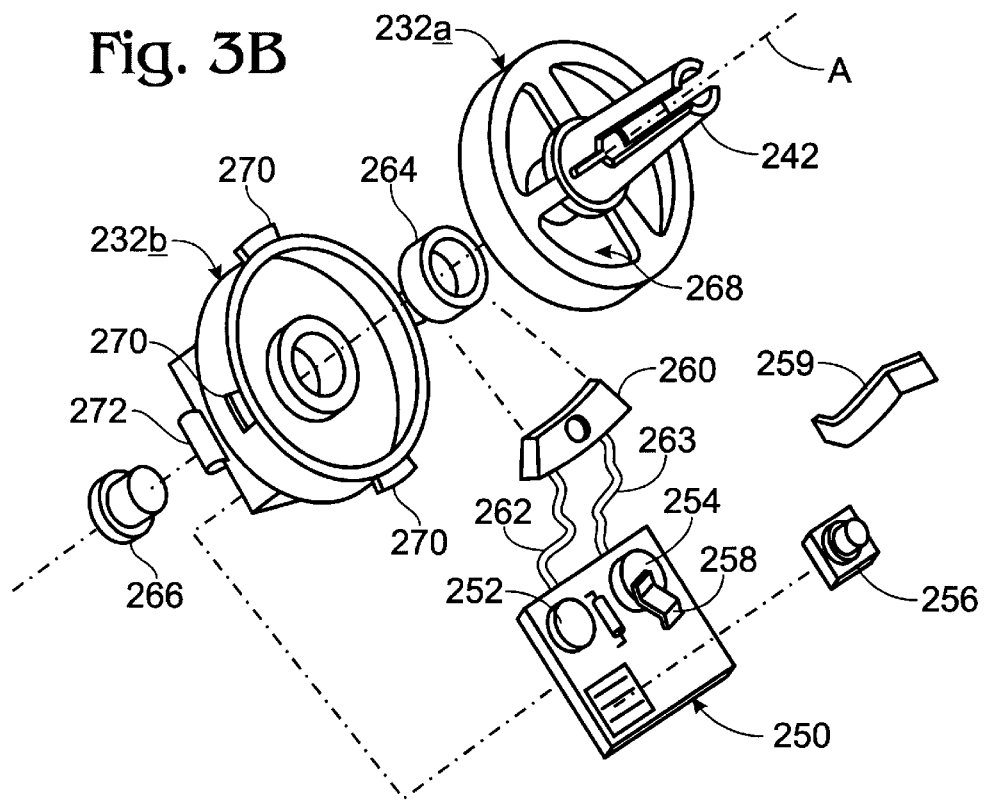
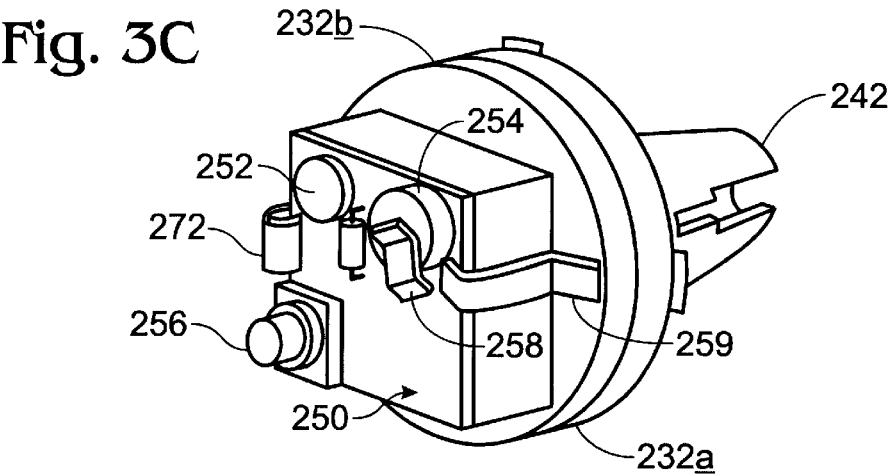

DENTA-MANDIBULAR SOUND-TRANSMITTING SYSTEM

CROSS REFERENCE TO RELATED APPLICATIONS

This application is a continuation of U.S. patent application Ser. No. 08/966,401, filed Nov. 7, 1997, titled SOUND RECORDING AND PLAYBACK SYSTEM, naming Andrew S. Filo and David G. Capper as inventors, which is incorporated herein by reference. In turn, that application is a continuation-in-part of U.S. patent application Ser. No. 08/961,647, filed Oct. 31, 1997, titled SOUND-TRANSMITTING AMUSEMENT DEVICE AND METHOD, also naming Andrew S. Filo and David G. Capper as inventors, which is incorporated herein by reference. In turn, that application is a continuation-in-part of U.S. patent application Ser. No. 08/948,715, filed Oct. 10, 1997, also titled SOUND-TRANSMITTING AMUSEMENT DEVICE AND METHOD, also naming Andrew S. Filo and David G. Capper as inventors, which is incorporated herein by reference. In addition, this application is based upon and claims the benefit under 35 U.S.C. § 119 of U.S. Provisional Application Serial No. 60/058,277, filed Sep. 9, 1997, which is incorporated herein by reference.

TECHNICAL FIELD

This invention relates to sound-transmitting devices. More particularly, it relates to devices for transmitting sound waves from a signal source through a sound-transmitting element to a user's mouth, from which the sound waves travel through the user's teeth and bones to the user's ears to be perceived as sound.

BACKGROUND OF THE INVENTION

Many devices function by appealing to one or more of the senses. For example, a radio appeals to hearing, a television appeals to hearing and sight, and a merry-go-round appeals to hearing, sight, and feel.

Sound generated by these devices generally reaches the ears by propagating through the air. Yet, devices based on airborne sound transmission suiffer from a number of shortcomings. Conventional speakers produce sound that may be overheard by or disturbing to others. Headphones block the ears and prevent the user from listening to other sounds. Moreover, headphones may be obtrusive and inconvenient.

Recently, a mechanism for transmitting sound to the ears that bypasses the air and external ears has been determined. Through this mechanism, sound waves are transmitted directly to the inner ears, without traveling through air, by conduction through an object to bones in the user's head, from which the sound waves travel through the bones to the ears to be perceived as sound.

The efficacy of devices based on this transmission mechanism is limited by the ability of the object that transmits the sound waves to contact the bone. In some cases, sound waves may be transmitted to the bone by passage through a user's skin and flesh, limiting the volume and clarity of the transmitted sound. In other cases, sound waves may be transmitted to the bone directly, but only after a component of the device is surgically implanted in a user's skull.

These shortcomings may be overcome by transmitting sound waves through an object to the user's mouth, from which the sound waves may be transmitted by the teeth and bones to the user's ears to be perceived as sound. This process is termed denta-mandibular conduction. Because teeth are connected directly to bones in the head, they provide a particularly desirable nonairborne sound conduit to the ears.

Devices based on denta-mandibular sound transmission are disclosed in several U.S. patents. The disclosed devices include a hearing aid, a teeth-held tilt alarm for operators of dangerous equipment, and an underwater communications device for scuba divers. Each of these devices functions only within a user's mouth. The hearing aid is mounted around a user's tooth and amplifies ambient sounds. The teeth-held tilt alarm is clenched between a user's teeth and produces a sound and vibration if the user's head tilts due to drowsiness. The underwater communications device also is clenched between a user's teeth as part of a scuba diving mouthpiece and produces sound that corresponds to signals received from a separate transmitter.

Significantly, these devices suffer from a number of shortcomings. The hearing aid and underwater communications device cannot operate independent of a separate signal source, but instead amplify ambient sounds or reproduce transmitted signals, respectively. The teeth-held tilt alarm produces only a single sound. Moreover, the teeth-held tilt alarm is not volitionally actuated, but instead is actuated if a user involuntarily falls asleep. In addition, all three devices are configured only for denta-mandibular sound transmission or a nonvolitional activity, such as hearing, breathing, or sleeping.

SUMMARY OF THE INVENTION

The present invention addresses these and other shortcomings by providing devices to communicate sound to a user by the transmission of signals representative of sound through the user's mouth to the user's ear, where denta-mandibular sound transmission is combined with volitional activities that are independent of denta-mandibular sound transmission.

In one embodiment, the device comprises a signal source configured to produce signals representative of sound, a sound-transmitting element operatively associated with the signal source to which the signal source can transmit signals representative of sound, and an independent-selective-activity structure, associated with the signal source and sound-transmitting element, and configured for use in a predetermined and selectable activity independent of or different from denta-mandibular sound transmission. In this and other embodiments, the sound-transmitting element can transmit signals from the signal source to a user's mouth upon contact of the element with the mouth, so that signals travel from the mouth to the user's ear where they can be perceived by the user as sound.

The signal source generally comprises any source configured to produce signals representative of sound. Such signals may be sound waves themselves, or they may be electrical signals suitable for conversion into sound waves by a transducer present in some embodiments of the invention.

The sound-transmitting element generally comprises any element that may transmit signals representative of sound upon contact with a user's mouth. Such elements may include edible substances, eating utensils, and writing implements, among others.

The independent-selective-activity structure generally comprises any structure configured to provide an activity that may be selected by the user and that is independent of or different from denta-mandibular sound transmission. Such structures may include holders for edible substances, eating utensils, writing implements, and toys, among others, where the independent activities comprise eating and drinking, writing, or playing, respectively. These activities and structures are in contrast to nonselectable activities, such as breathing, and structures associated with such nonselectable activities, such as scuba diving mouth pieces.

In alternative embodiments of the invention, the signal source and sound1 transmitting element are associated with a hand-manipulable structure or an activity means. The hand-manipulable structure is configured to accomplish a predetermined function independent of or different from denta-mandibular sound transmission by and during manipulation of the structure with the user's hand. The activity means provides a predetermined, selectable activity different from denta-mandibular sound transmission. Such structures and means again may include holders for edible substances, eating utensils, writing implements, and hand-manipulable toys, among others. Such structures and means exclude items that are not configured to accomplish an independent or different function, such as a scuba diving mouthpiece.

In other alternative embodiments of the invention, the device comprises a signal source and sound-transmitting element. The signal source may be configured to produce a plurality of prerecorded signals representative of sound, and the user may be able to selectively transmit at least one signal out of the plurality of prerecorded signals representative of sound. Alternatively, the signal source and sound-transmitting element may be self-contained, volitionally actuated by the user, and configured to operate independent of any other item.

In yet another alternative embodiment of the invention, the device comprises an amusement structure configured to provide amusement independent of denta-mandibular sound transmission, a sound-transmitting portion of the amusement structure capable of being placed into contact with the user's mouth, and a signal source operatively associated with the amusement structure and configured to produce signals representative of sound and to transmit the signals through the sound-transmitting portion of the amusement structure. Amusement structures include all structures configured to amuse. Such amusement structures may include holders for edible substances, eating utensils, writing implements, and toys, among others.

The nature of the present invention will be understood more readily after consideration of the drawings and the detailed description of the preferred embodiments that follow.

BRIEF DESCRIPTION OF THE DRAWINGS

FIG. 3A is a side elevation view of yet another alternative embodiment of an amusement device constructed in accordance with the present invention.

FIG. 3B is an exploded perspective view of the device shown in FIG. 3A.

FIG. 3C is a rear perspective view of a portion of the device shown in FIG. 3B.

DETAILED DESCRIPTION OF PREFERRED EMBODIMENTS AND BEST MODES OF CANTING OUT THE INVENTION

Figure 1A:
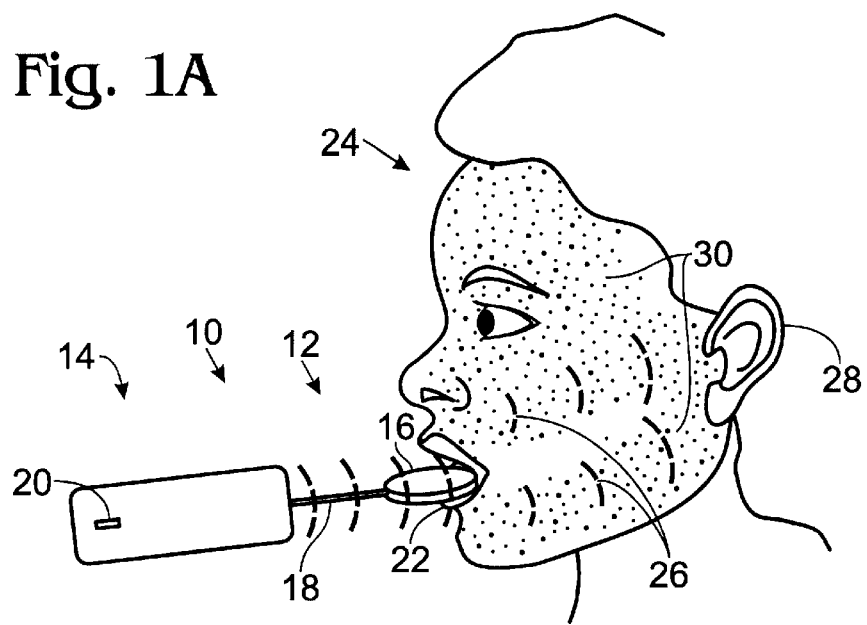
FIG. 1A is a side elevation view of an amusement device constructed in accordance with the present invention, showing the device in use.

FIG. 1A shows an embodiment of a device 10 constructed in accordance with the present invention. Generally, the invention includes a signal source configured to produce signals representative of sound and a sound-transmitting element operatively associated with the signal source to which the signal source can transmit signals representative of sound, where the sound-transmitting element can transmit the signals to the user's mouth upon contact of the element with the mouth, so that the signals travel from the mouth to the user's ear where they can be perceived by the user as sound.

FIGS. 1A–4 show embodiments of the invention in which the sound-transmitting element takes the form of an edible substance. In the embodiment shown in FIGS. 1A and 1B, the sound-transmitting element takes the form of an edible substance 12 that is received and held by a holder 14. Edible substance 12 may be a lollipop having a candy portion 16 and a stick portion 18. Holder 14 may house the signal source (not visible) and also may provide a switch 20 for actuating the signal source.

Device 10 is used by grasping holder 14 with a hand, actuating the signal source using switch 20, and placing edible substance 12 in contact with the mouth 22 of a user 24. Mouth 22 can include lips, tongue, gums, palate, teeth, jaws or other structures generally contained within the user's oral cavity. Such other structures can include fillings, crowns, caps, bridgework, braces, false teeth, dental implants, or other dental appliances. The signal source, or a transducer connected thereto, produces sound waves 26, indicated in FIG. 1A by curved lines that are convex in the direction of propagation. Sound waves 26 travel through edible substance 12 to user's mouth 22, from which they travel through the user's teeth and bones to the user's ears 28, where they are perceived as sound. More specifically, sound waves 26 travel from user's mouth 22 to user's ears 28 at least in part through the denta-mandibular bone structure 30, indicated in FIG. 1A by stippling. The transmission of sound through the denta-mandibular bone structure to the user's ear causes sound to be heard by the user as if the sound was "in the user's head."

Figure 1B:
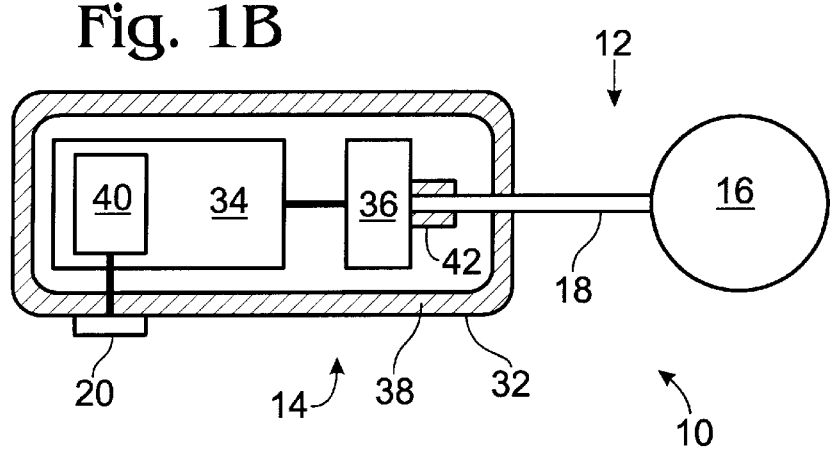
FIG. 1B is a partially schematic, cross-sectional view of the device shown in FIG. 1A, showing the operative parts of the invention.

FIG. 1B shows a more detailed view of device 10. Holder 14 includes a housing 32, a signal source 34 surrounded by the housing, and a connection 36. The inside of the housing may be lined with insulation 38 to ensure that little or no sound exits holder 14, except through edible substance 12. The outside of the housing generally is configured to present a pleasing yet functional appearance. Housing 32 may include indentations to make holder 14 easier to grip, and any potentially sharp edges on the housing may be rounded to minimize hazards associated with unintended impacts. Housing 32 may be formed in a shape that complements a preferred edible substance. For example, if the device is intended for use at Christmas, the housing could be shaped like a Santa Claus and configured to receive a candy cane. In this way, holder 14 may comprise an amusement structure configured to provide amusement independent of denta-mandibular sound transmission.

The signal source in this and other embodiments generally comprises any source configured to produce signals representative of sound. These signals may be sound waves themselves, or they may be electrical signals suitable for conversion into sound waves by a transducer present in some embodiments of the invention. As used here, the term "sound" refers either or both (1) to compression waves or vibrations generated by the signal source, or a transducer connected thereto, and/or (2) to the physiological perception of such compression waves. Such compression waves are transmitted or communicated by material media. The signal source may be an electronic, mechanical, or piezoelectric device, and it further may include a dampened speaker operatively connected to the sound-transmitting element. Examples of signal sources include preprogrammed microprocessor chips, integrated circuits, musical instruments, music boxes, radios, and tape or compact disc players. Examples of sounds generated by the sound sources include music, noises, and spoken words.

The signal source may produce a single signal representative of sound, or it may produce a plurality of such signals, where the user can selectively transmit at least one signal out of the plurality of prerecorded signals. An example of such a signal source is an integrated circuit containing a plurality of preprogrammed or recorded sounds, where the user can select a single sound for transmission.

In device 10, signal source 34 includes a power supply 40 and switch 20. Power supply 40 provides energy to operate signal source 34 and to produce sound waves 26. The preferred power supply is batteries, although any power source may be employed. Switch 20 controls power supply 40. The switch may be pressure-sensitive, triggering automatically when device 10 contacts the user's mouth. Alternatively, the switch may be volitionally actuated, permitting a user to turn signal source 34 on and off as desired.

The invention further may include a connection 36 between the sound-transmitting element and the signal source, whereby signals produced by the signal source may be transmitted to the sound-transmitting element. This connection may take the form of a holder for holding the sound-transmitting element, as described above, or any other structure that touches at least a portion of the sound-transmitting element. In device 10, connection 36 includes a receptor 42 to receive and hold edible substance 12. If the signal source produces sound waves, the connection may be any material substance capable of conducting sound waves.

If the signal source does not produce sound waves, but instead produces an electrical signal, the invention further may comprise a transducer to convert the electrical signals to sound waves. Such a transducer would be operatively situated between the signal source and the sound-transmitting element.

In some embodiments of the invention, the holder and/or connection may be configured such that the holder, connection, and/or the item held by the holder may be placed in contact with the user's mouth to transmit sound and thereby practice the invention. For example, a holder may hold an edible substance, an eating utensil, or a writing implement while also providing a portion of the holder for contact with a user's mouth and teeth.

Figure 5A:
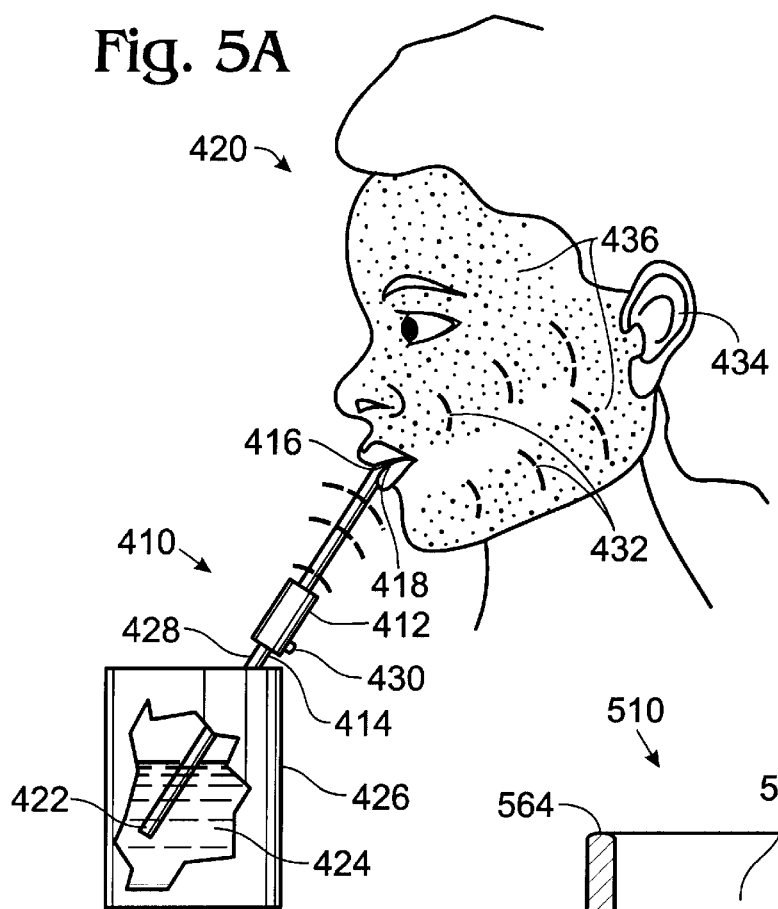
FIG. 5A is a side elevation view of yet another alternative embodiment of an amusement device constructed in accordance with the present invention, showing the device in use.
Figure 6:
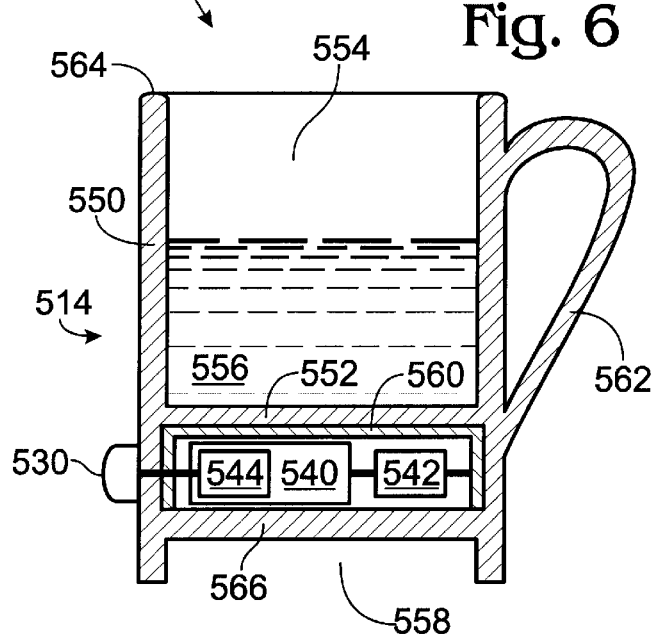
FIG. 6 is a partially schematic, cross-sectional view of yet another alternative embodiment of an amusement device constructed in accordance with the present invention.
Figure 7A:
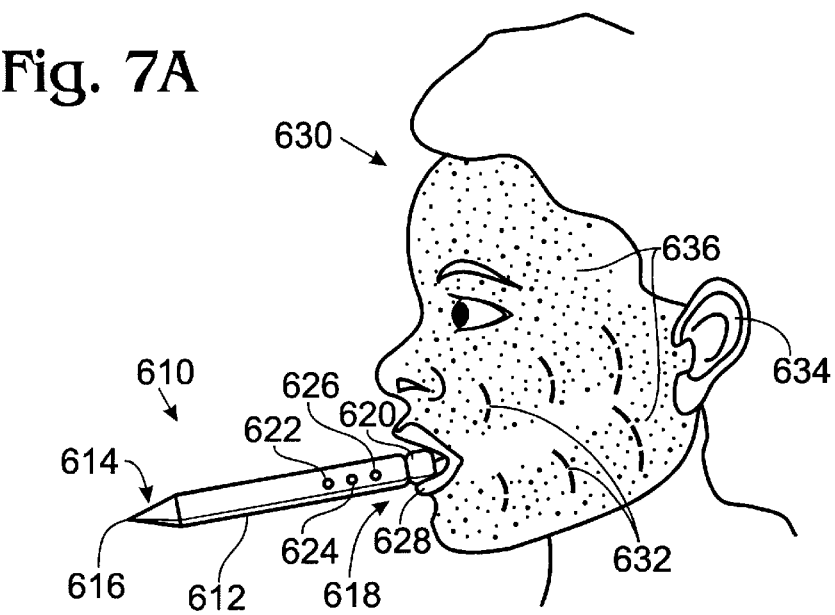
FIG. 7A is a side elevation view of a sound recording and playback device constructed in accordance with the present invention, showing the device in use to play back recorded sound.

The sound-transmitting element in this and other embodiments generally comprises any element that can transmit signals representative of sound from the signal source to a user's mouth. FIGS. 1A–4 show embodiments in which the sound-transmitting element comprises an edible substance, FIGS. 5A–6 show embodiments in which the sound-transmitting element comprises an eating utensil, and FIGS. 7A–8 show embodiments in which the sound-transmitting element comprises a writing implement. The sound-transmitting element also may comprise pacifiers, teething rings, pipes, cigarette holders, candy dispensers, tooth brushes, and toys, among others. Toys comprise objects for children or others to play with, and include items such as the music box shown in FIG. 4, dolls, toy cards, etc.

In device 10, the sound-transmitting element takes the form of edible substance 12, which generally comprises any substance a user can place in the mouth and consume. For example, the edible substance may include lollipops, other substantially rigid substances, or substances specifically configured for contact with a user's teeth. The edible substance need not have a uniform composition; for example, a preferred edible substance is a lollipop sold under the trademark TOOTSIE ROLL POP, which has a chewy interior surrounded by a hard candy exterior.

This and other embodiments of the invention provide functions, mechanisms, and activity means different and independent of denta-mandibular sound transmission. For example, the holder in device 10 comprises an independent-selective-activity structure that is configured for use in the predetermined and selectable activities of holding an edible substance and providing amusement through appearance and feel. These activities are independent of denta-mandibular sound transmission. In addition, the holder also comprises a hand-manipulable structure configured to accomplish the predetermined function of holding an edible substance and providing amusement by manipulation of the structure with the user's hand. This function also is independent of denta-mandibular sound transmission. These functions also are volitional, in contrast to activities such as breathing in a scuba diving system, in that they are selected, discretionary functions.

Other volitional functions, mechanisms, and activity means should be apparent from the exemplary sound-transmitting elements listed above. These include eating, drinking, writing, suckling, teething, smoking, playing, and practicing good oral hygiene, among others.

The signal source and sound-transmitting element may be self-contained, volitionally actuated by the user, and configured to operate independent of any other item. In device 10, signal source 34 and sound-transmitting edible substance 12 form a single, self-contained unit, which may be volitionally actuated using switch 20 and which may operate independent of any other item if signal source 34 contains preprogrammed or recorded sounds.

Figure 2:
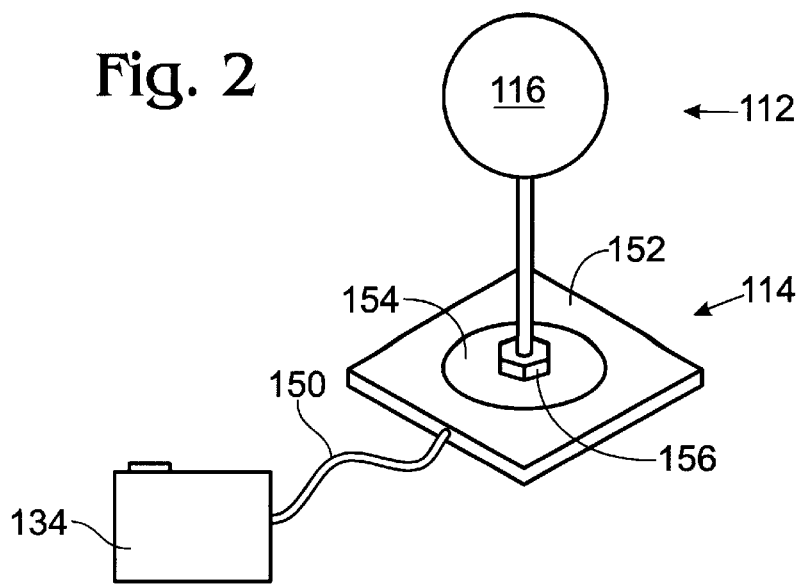
FIG. 2 is a partially schematic, isometric view of an alternative embodiment of an amusement device constructed in accordance with the present invention.
Figure 3D:
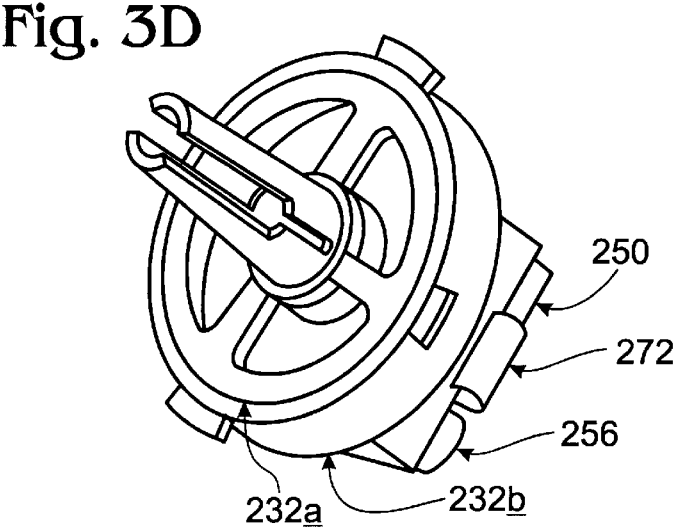
FIG. 3D is a front perspective view of the portion shown in FIG. 3C.

FIG. 2 shows an alternative embodiment of the invention. In this embodiment, the signal source 134 is connected to a holder 114 for the edible substance 112 by a flexible wire 150. The flexible connection between signal source 134 and edible substance 112 is employed to permit a greater variety of signal sources to be used with the invention. For example, signal source 134 may be a radio, compact disk or tape player, or a musical instrument, wherein flexible wire 150 is plugged into a standard output jack positioned in the signal source.

The nature of flexible wire 150 depends on the nature of the signals produced by the signal source. If signal source 134 produces sound waves, then flexible wire 150 must be capable of acoustic transmission; an example of such a wire is a hollow, small-bore, air-filled tube. Alternatively, if signal source 134 produces an electrical signal, then flexible wire 150 must be capable of electrical transmission; an example of such a wire is standard copper or aluminum electrical wire. In the embodiment shown in FIG. 2, signal source 134 produces electrical signals, and flexible wire 150 is a simple two-wire electrically conductive cable.

Holder 114 includes a base 152, a transducer 154, and a vertical support 156 configured to receive and hold edible substance 112. Transducer 154 may be integrally incorporated into base 152, so that the two components form a substantially planar unit. Vertical support 156 may be mounted to the face of transducer 154 and serves three functions: (1) receiving and holding edible substance 112, (2) transmitting the sound waves produced by transducer 154 into the edible substance, and (3) inhibiting or dampening airborne transmission of sound waves produced by the air.

In one holder, the base and transducer comprise an 8 ohm, 0.4 watt speaker, such as a model TS-30 speaker marketed by Fuji. Such a speaker converts the electrical signals received from signal source 134 through flexible wire 150 into sound waves. The vertical support comprises a simple hexagonal nut having an approximately one-eighth inch threaded opening for receiving and holding the edible substance. The nut is attached to the speaker using suitable mounting means, such as glue.

Holder 134 can be configured to operate with a variety of edible substances. In the shown embodiment, holder 134 is again configured to receive a lollipop. Note that the discoidal candy portion of the lollipop 16 in FIGS. 1A and 1B has been replaced with a spherical candy portion 116 in this and subsequently shown edible-substance embodiments.

FIGS. 3A–3D show yet another alternative embodiment of the invention. In this embodiment, an edible substance 212 is connected to a holder 214 to form a device 210, in which the signal source is an electronic device, specifically a battery-powered printed circuit board that is coupled to a voice coil transducer.

The heart of the signal source is a substantially planar printed circuit board 250. Mounted to printed circuit board 250 are a microprocessor or integrated circuit chip 252, a battery 254, and a switch 256. Battery 254 is held in place by a strip 258. A terminal printed circuit board 260 is connected to one side of printed circuit board 250 by wires 262, 263. Terminal printed circuit board 260 engages a voice coil 264 that is biased by a magnet 266.

The components described above are mounted to a two-piece housing, which has a substantially circular cross section perpendicular to an axis A. A front housing 232a is configured to receive and hold edible substance 212 through a receptor 242, and to receive voice coil 264. Front housing 232a also includes a series of open windows 268. A rear housing 232b is configured to receive magnet 266, as well as printed circuit board 250 and those components attached to it. Front housing 232a may be mated with rear housing 232b and held in place using snap tabs 270. Printed circuit board 250 is held in place further by a strip 259 and printed circuit board clip 272.

Device 210 is used as follows. Switch 256 is used to actuate microprocessor or integrated circuit chip 252, which produces electronic signals representative of sound. These electronic signals cause voice coil 264 to vibrate, producing sound waves. These sound waves are transmitted to edible substance 212 through receptor 242 and will be heard by a user when edible substance 212 is placed in contact with the user's mouth.

Figure 4:
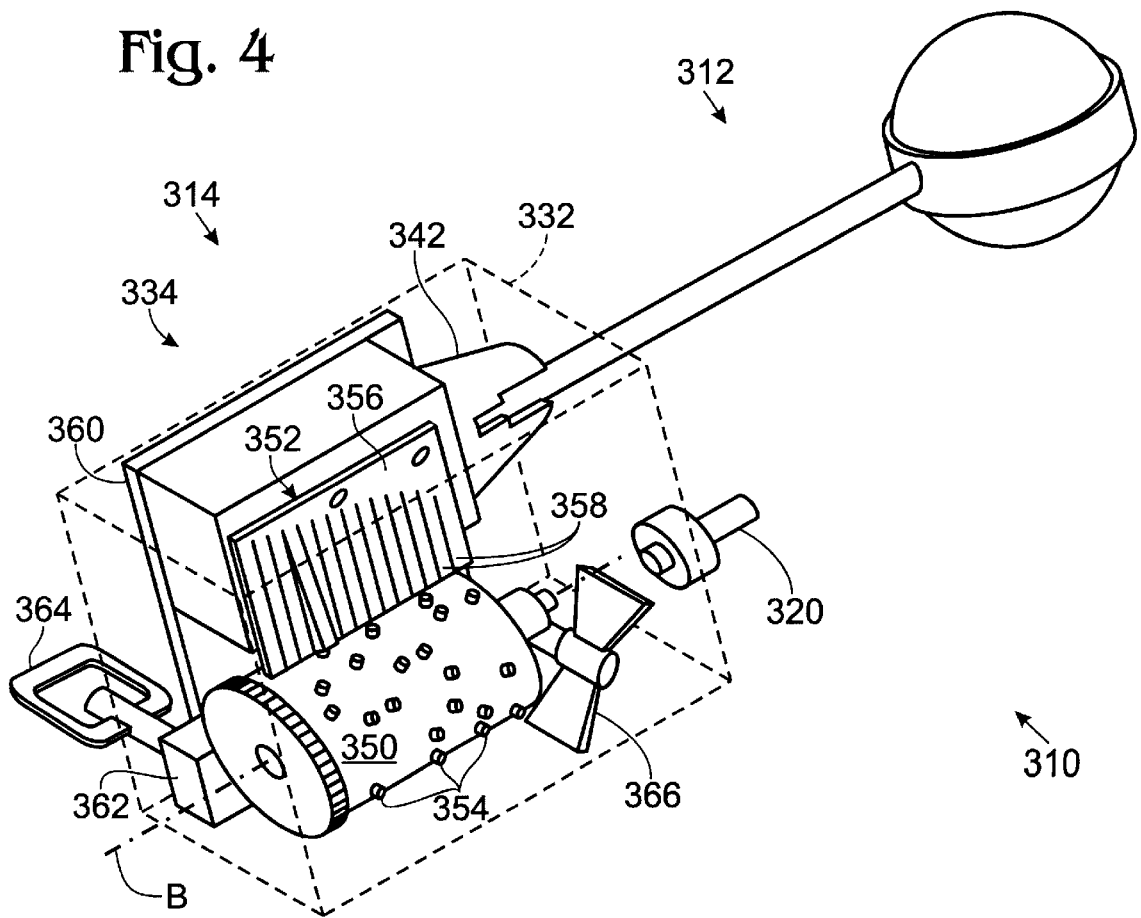
FIG. 4 is a perspective view of yet another alternative embodiment of an amusement device constructed in accordance with the present invention.

FIG. 4 shows yet another alternative embodiment of the invention. Externally, this embodiment resembles the embodiment in FIGS. 1A and 1B. Specifically, an edible substance 312 is connected to a holder 314 to form a device 310, in which the signal source is a mechanical music box toy 334. The mechanical music box generates sound waves directly, taking the place of the electronic signal source and transducer in the embodiments discussed above. Although a music box is described, other mechanical sound generators also may be used in this embodiment.

Music box 334 contains a gear-driven, rotating pin drum 350 and a tine harp 352. Pin drum 350 is substantially cylindrical, having a long axis B, and includes outwardly projecting pins 354 located at preselected positions over the surface of the cylinder. Pin drum 350 may rotate about axis B during use. Tine harp 352 resembles a comb, having a strip 356 that supports a row of downwardly projecting tines 358. Pin drum 350 and tine harp 352 are preferably formed of hard substances, such as metal, and are mounted on a base frame 360 and enclosed within a housing 332.

Music box 334 produces sound by causing pin drum 350 to rotate such that pins 354 "pluck" a preselected series of tines 358 on tine harp 352. Plucking constitutes sequentially engaging and disengaging the tines to cause them to vibrate, setting up sound waves. When so plucked, each tine produces a different sound, due to differences in the tines' resonance frequencies as determined by their length, width, and/or rigidity. These sounds propagate through tine harp 352 and base frame 360 to a receptor 342, from which they are transmitted to edible substance 312.

Pin drum 350 is turned by a drive mechanism 362. The drive mechanism uses energy that the user provides by turning a wind key 364 mounted to housing 332. A governor 366 controls the rate at which pin drum 350 turns.

The device in FIG. 4 is used like the device in FIGS. 1A and 1B, as described above. A switch or pin 320 mounted on the housing is used to actuate the music box, and edible substance 312 is placed in contact with the mouth for the user to hear the sounds.

FIGS. 5A–6 show embodiments of the invention in which the sound-transmitting element takes the form of an eating utensil. FIG. 5A shows an embodiment of the device 410 in which a holder 412 is employed to house a signal source and to receive and hold an eating utensil 414. Eating utensil 414 may be a drinking straw having a first end 416 for contacting the mouth 418 of a user 420, a second end 422 for contacting a liquid 424 in a container 426, and a middle 428 that is received by holder 412. Holder 412 also may provide a switch 430 for actuating the signal source.

Device 410 is used by grasping holder 412 or eating utensil 414 with a hand, actuating the signal source using switch 430, and placing the eating utensil in contact with mouth 418 of user 420. In addition to its use in practicing the invention, eating utensil 414 also may be used to practice its normal function, for example, drawing liquid 424 from container 426 to mouth 418 in the case of a drinking straw. Sound waves 432 travel through eating utensil 414 to user's mouth 418, from which they travel through the user's teeth and bones to the user's ears 434, where they are perceived as sound. Sound waves 432 again travel at least in palt through the denta-mandibular bone structure 436, indicated in FIG. 5A by stippling.

Figure 5B:
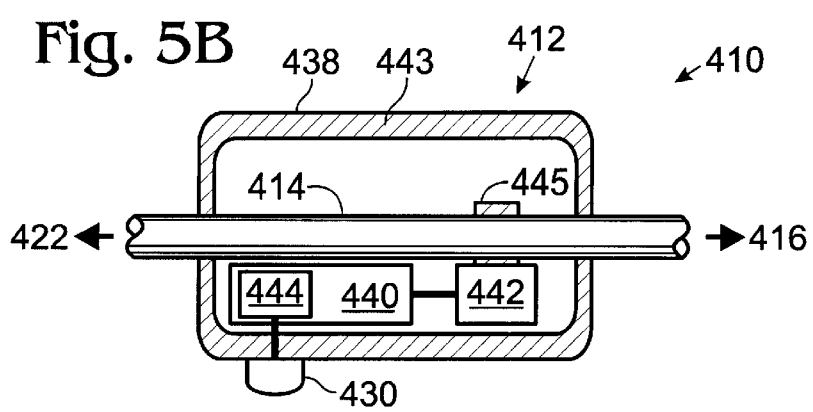
FIG. 5B is a partially schematic, cross-sectional view of the device shown in FIG. 5A, showing the operative parts of the invention.

FIG. 5B shows a more detailed view of device 410. Holder 412 includes a housing 438, a signal source 440 surrounded by the housing, and a connection 42. Housing 432 resembles housing 32 of device 10, described above. The inside of the housing may be lined with insulation 448 to ensure that little or no sound exits holder 412, except through eating utensil 414. The outside of the housing generally is configured to present a pleasing yet functional appearance. Housing 438 may include indentations to make holder 412 easier to grip, and any potentially sharp edges on the housing may be rounded to minimize hazards associated with unintended impacts. Housing 438 may be formed in a shape that complements a preferred eating utensil or dining environment. For example, if the device is intended for use at a Chinese restaurant, the housing could be shaped like a panda and configured to receive chopsticks.

In device 410, signal source 434 includes a power supply 444 and switch 430.

Power supply 444 provides energy to operate signal source 440 and to produce sound waves 432. Switch 430 controls power supply 444, permitting a user to actuate signal source 440 as desired. Power supply 444 and switch 430 resemble power supply 40 and switch 20 of device 10, described above.

The invention further may include a connection 442 between eating utensil 414 and signal source 440, whereby signals produced by the signal source may be transmitted to the eating utensil. Connection 442 may include a receptor 445 to receive and hold eating utensil 414. Connection 442 and receptor 445 resemble connection 36 and receptor 42 of device 10, described above.

Eating utensil 414 generally comprises any instrument, vessel, or container that is used to consume, dispense, or store food or drink and that comes into contact with the user's mouth. For example, the eating utensil may comprise items generally associated with eating, such as knifes, forks, spoons, chopsticks, or food containers. The eating utensil also may comprise items generally associated with drinking, such as drinking straws, cups, mugs, glasses, drink containers, and baby bottles. The eating utensil also may comprise items generally associated with storing or dispensing food or drink, such as a dispenser for a hard candy. The eating utensil need not have a uniform or particular composition. For example, drinking straws may be made of paper, plastic, glass, or a combination of these or other compositions.

In some embodiments of the invention, the eating utensil may take the form of an edible substance dispenser. An edible substance dispenser generally comprises a container used to store and dispense edible substances. Sound may be transmitted from a signal source operatively associated with the edible substance dispenser to a user's ears whenever the edible substance dispenser is brought into contact with the user's mouth. Such contact may be initiated to dispense edible substances, or it may be initiated simply to listen to the transmitted sound. A familiar example of an edible substance dispenser suitable for use with the present invention is a dispenser for a hard candy sold under the trademark PEZ.

FIG. 6 shows yet another alternative embodiment of the invention. In this embodiment, the sound-transmitting element of the device 510 takes the form of a drinking cup having sides 550 and a true bottom 552 joined to the sides to form a first cavity 554 for holding a liquid 556, and a second cavity 558 for holding a signal source 540 and a connection 542. Second cavity 558 further may include insulation 560 to protect signal source 540 and connection 542 fiom temperature extremes if eating utensil 514 is used for hot or cold liquids. Signal source 540 further may include a power supply 544 and a switch 530 for actuating the power supply and signal source. Device 510 further may include a handle 562 for grasping, a rim 564 for contacting the mouth of a user, and a false bottom 566 for hiding, protecting, and further insulating signal source 540 and connection 542.

The design in FIG. 6 is intended to be flexible. For example, signal source 540 may take various forms, as discussed above for device 410. Connection 542 also may take various forms, and may comprise a structure touching the drinking cup or a holder for holding the drinking cup. False bottom 566 may be held in place by friction, as shown, or it may be held by other attachment means, such as glue or screws. Switch 530 may be placed on sides 550, as shown, or it may be placed below the mug in second cavity 558 adjacent false bottom 566.

The design in FIG. 6 also is intended to be safe and attractive. The edges of device 510 may be rounded to minimize potential impact hazards. The materials used in the construction of device 510 may be chosen to resist breaking and/or to insulate users from hot liquids. The exterior surfaces of device 510 may be provided with an attractive and durable finish, which may bear designs that celebrate special occasions or locations.

Device 510 is used like device 410 in FIGS. 5A and 5B, as described above. Briefly, device 510 is used by grasping handle 562 with a hand, actuating signal source 540 using switch 530, and placing rim 564 in contact with the mouth of a user. Sound signals generated by signal source 540 are transmitted by connection 542 to eating utensil 514, from which they travel through rim 564 to the user's mouth and on to the user's ears. The sound-transmitting capabilities of device 510 may be used consciously, or they may be used as a gag. When used as a gag, switch 530 could be activated by a third person and the mug given to a user who was unaware that the mug would transmit sounds when placed in contact with the user's mouth.

FIGS. 7A–8 show sound recording and playback embodiments of the invention in which the sound-transmitting element takes the form of a writing implement. These embodiments generally include a recorder, a signal source, and a sound-transmitting element, whereby signals representative of sound detected and recorded by the recorder may be played back by the signal source through the sound-transmitting element for transmission through a user's mouth to the user's ears.

FIG. 7A shows an embodiment of the device 610 in which a writing implement 612 is employed to house a recorder and signal source. The writing implement may include a writing end 614 to present a pencil lead or pen nib 616, and an erasing end 618 to hold a sound-transmitting element 620, which here takes the form of a faux eraser that is part of the writing implement. The recorder and signal source generally are located near erasing end 618, so that the signal source may be conveniently and operatively associated with sound-transmitting element 620. The writing implement also may include a recording switch 622 for actuating the recorder, a playback switch 624 for actuating the signal source, and a microphone 626 for detecting sound.

Device 610 can be used in record and/or playback modes. In record mode, writing implement 612 is grasped with a hand, the recorder is actuated using recording switch 622, and microphone 626 is used to detect and record sound, such as the voice of a user. In playback mode, writing implement 612 again is grasped with a hand, the signal source is actuated using playback switch 622, and sound-transmitting element 620 is used to transmit sound. Specifically, sound-transmitting element 620 is placed in contact with the mouth 628 of a user 630. Sound waves 632 travel through sound-transmitting element 620 to user's mouth 628, from which they travel through the user's teeth and bones to the user's ears 634, where they are perceived as sound. Sound waves 632 again travel at least in part through the denta-mandibular bone structure 636, indicated in FIG. 7A by stippling.

The writing implement may include any implement that can be used for writing or drawing, as well as faux writing implements made to resemble actual writing implements. For example, the writing implement may include crayons, wooden or mechanical pencils, fountain or ballpoint pens, or writing implements specifically configured for contact with a user's teeth. Neither the writing implement, nor the sound-transmitting element in general, need have a uniform or particular composition.

Figure 7B:
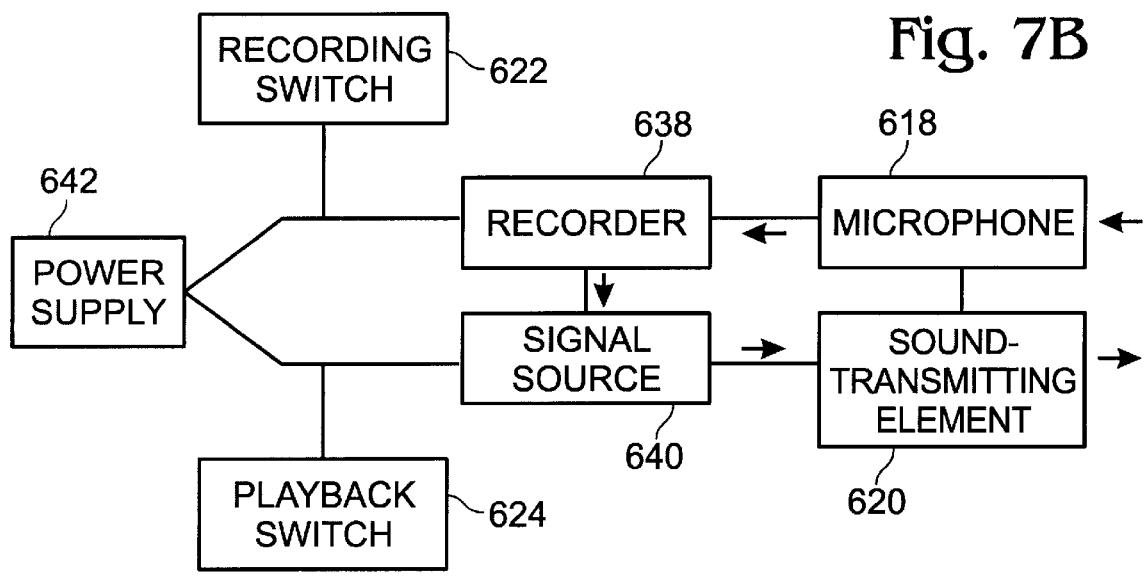
FIG. 7B is a block diagram of the sound recording and playback device shown in FIG. 7A, showing the operative parts of the invention.
Figure 8:
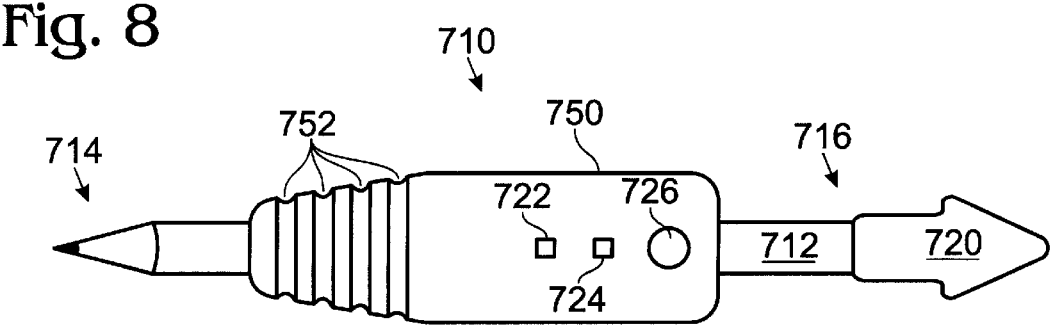
FIG. 8 is a side elevation view of an alternative embodiment of a sound recording and playback device constructed in accordance with the present invention.

FIG. 7B shows the operational elements of the sound recording and playback device shown in FIG. 7A. The central operational elements are a recorder 638 and a signal source 640. These elements are powered by a power supply 642 and actuated by recording switch 622 and playback switch 624, respectively. Recorder 638 converts sound detected by microphone 618 into signals representative of sound, which it then records. Signal source 640 transmits such recorded or other signals representative of sound to sound-transmitting element 620. Arrows in FIG. 7B indicate generally the direction traveled by sound or signals representative of sound through the system.

The recorder generally comprises any recorder configured to convert sound into signals representative of sound, and to record such signals for later playback. The recorder also includes a detector, such as microphone 618, for detecting sound to be recorded by the recorder.

The recorder and signal source may be separate units, or they may be integrated to form a single unit, such as an integrated circuit capable of recording sound and playing it back. The device also may include only a sound playback chip with prerecorded sound recordings stored on the chip. Any standard sound recording and playback chip or sound playback chip can be used.

Power supply 640 provides energy to operate recorder 638 and signal source 640. The preferred power supply is batteries, although any power source may be employed.

Recording switch 614 and playback switch 616 control the power supply and either recorder 638 or signal source 640, respectively. These switches permit a user to actuate either the record function or the playback function, as desired. These switches may be mechanical, such that they are actuated by pushing them toward or sliding them along writing implement 612. Playback switch 616 also may be pressure-sensitive, such that it is triggered automatically when sound-transmitting element 620 is placed in contact with the user's mouth.

FIG. 8 shows an alternative sound recording and playback embodiment of the invention. In this embodiment, a recorder and signal source are housed in a holder 750 for a writing implement, rather than within a writing implement itself. This embodiment permits the invention to be practiced with a conventional writing implement 712, which may be inserted conveniently into the holder.

Holder 750 may be configured both to receive a writing implement and to facilitate being gripped with a hand. To facilitate its receiving a writing implement, holder 710 may have an aperture through which the writing implement may be snugly but yieldingly inserted. To facilitate its being gripped, holder 750 may be contoured to be narrower near the writing end 714 and wider near the eraser end 716 of writing implement 712. Moreover, holder 750 may include indentations 752 to reduce slippage.

Device 710 is used much like device 610 described above. Specifically, device 710 is actuated for recording using a recording switch 722, and the device detects sound using a microphone 726. Similarly, device 710 is actuated for playback using a playback switch 724, and the device transmits sounds using writing implement 712 as the sound-transmitting element. These sounds may be transmitted to a user as described above, for example, by contacting an end of the writing implement to the user's mouth. The writing implement also may be fitted with a special cap or faux eraser 720 to facilitate transmitting sound to the mouth, but this is not necessary to practice the invention. The device also may be configured to permit playback through conventional speakers or headphones, in addition to the sound-transmitting element.

The holder may, of course, take other forms. For example, in an alternative embodiment, the holder may take the form of a pencil topper, which would be placed over eraser end 716 of writing implement 712 much like a cap eraser.

A significant aspect of the invention is that both novelty and utility are ensured by the nearly limitless combinations of sound-transmitting elements and sound signals that may employed. For example, novel amusement devices may be constructed by combining a lollipop or drinking straw with a signal source configured to produce amusing sounds. Alternatively, utilitarian devices may be constructed by combining a writing implement with a sound recording and playback, or sound playback, mechanism.

The invention also may be configured to receive and/or record radio signals. These signals may originate fiom commercial AM/FM radio stations, or they may originate from dedicated transmitters, broadcasting at special frequencies. For example, the invention may be used to "listen" to the radio without disturbing others, where an edible substance, eating utensil, writing implement, or other sound-transmitting element is used to transmit signals to the ears in lieu of headphones. Altenatively, the invention may be used to listen to game information broadcast by dedicated transmitters at sporting events, or exhibit information at fairs, parks, or zoos.

Another significant aspect of the present invention involves safety. Many amusement and other devices have short shelf lives due to recalls prompted by safety concerns, including those posed by electrical shock and unintended ingestion. The devices offered by the present invention circumvent these shortcomings by isolating the electrical components from the user's body and by ensuring that the component of the invention that contacts the user's mouth is intended for such contact.

Accordingly, while the present invention has been shown and described with reference to the foregoing preferred devices for its use, it will be apparent to those skilled in the art that other changes in fornm and detail may be made therein without departing from the spirit and scope of the invention as defined in the appended claims.

We claim:

1. A device to communicate sound to a user by the transmission of signals through the user's mouth to the user's ear, the device comprising:

a signal source configured to produce signals representative of sound;

a transducer operatively associated with the signal source to produce vibrations from the signals representative of sound;

a sound-transmitting element operatively associated with the transducer to which the transducer can transmit vibrations;

a power supply associated with the signal source;

a housing for at least the signal source, transducer and power supply; and an independent-selective-activity structure, associated with the sound-transmitting element and housing, configured for use in a predetermined and selectable activity different from denta-mandibular sound transmission;

where the sound-transmitting element can transmit the vibrations to the user's mouth upon contact of the element with the mouth, so that the vibrations travel from the mouth to the user's ear where they can be perceived by the user as sound;

where the sound-transmitting element is positioned adjacent the transducer so that vibrations transmitted from the signal source to the sound-transmitting element are sufficient to be perceivable by the user as sound when the sound-transmitting element is in contact with the user's mouth; and where the signal source, transducer and power supply are configured within the housing.

2. The device of claim 1, where the independent-selective-activity structure comprises a holder for an edible substance, and the selectable activity is holding the edible substance.

3. The device of claim 1, where the independent-selective-activity structure comprises an eating utensil, and the selectable activity is consuming an edible substance.

4. The device of claim 1, where the independent-selective-activity structure comprises a writing implement, and the selectable activity is writing.

5. The device of claim 1, where the independent-selective-activity structure comprises a toy, and the selectable activity is playing.

6. A device to communicate sound to a user by the transmission of signals through the user's mouth to the user's ear, the device comprising:

a signal source configured to produce signals representative of sound;

a transducer operatively associated with the signal source to produce vibrations from the signals representative of sound;

a sound-transmitting element operatively associated with the transducer to which the transducer can transmit vibrations;

a power supply associated with the signal source;

a housing for at least the signal source, transducer and power supply; and a hand-manipulable structure associated with the sound-transmitting element and housing;

where the hand-manipulable structure is configured to accomplish a predetermined function different from denta-mandibular sound transmission by and during manipulation of the structure with the user's hand;

where the sound-transmitting element can transmit the vibrations to the user's mouth upon contact of the element with the mouth, so that the vibrations travel from the mouth to the user's ear where they can be perceived by the user as sound; and where the sound-transmitting element is positioned adjacent the transducer so that vibrations transmitted from the signal source to the sound-transmitting element are sufficient to be perceivable by the user as sound in the sound-transmitting element is in contact with the user's mouth; and where the signal source, transducer and power supply are configured within the housing.

7. The device of claim 6, where the hand-manipulable structure comprises a holder for an edible substance, where the holder may be held by hand and used to hold an edible substance.

8. The device of claim 6, where the hand-manipulable structure comprises an eating utensil that may be held by hand and used to consume an edible substance.

9. The device of claim 6, where the hand-manipulable structure comprises a writing implement that may be held by hand and used to form marks on a surface.

10. The device of claim 6, where the hand-manipulable structure comprises a toy that may be held by hand and used to play.

11. A device to communicate sound to a user by the transmission of signals through the user's mouth to the user's ear, the device comprising:

a signal source configured to produce signals representative of sound;

a sound-transmitting element operatively associated with the signal source to which the signal source can transmit signals representative of sound; and an activity means, associated with the signal source and sound-transmitting element, for providing a predetermined, selectable activity different from denta-mandibular sound transmission;

where the sound-transmitting element can transmit the signals to the user's mouth upon contact of the element with the mouth, so that the signals travel from the mouth to the user's ear where they can be perceived by the user as sound;

where signals transmitted from the signal source to the sound-transmitting element are sufficient to be perceivable by the user as sound when the sound-transmitting element is in contact with the user's mouth; and where the sound perceivable by the user from the signals produced by the signal source is predominantly from signals transmitted from the sound-transmitting element through the user's mouth to the user's ear rather than from the signals fiom the signal source that otherwise may be transmitted to the user's ear.

12. A device to communicate sound to a user by the transmission of signals through the user's mouth to the user's ear, the device comprising:

an amusement structure configured to provide amusement independent of denta-mandibular sound transmission;

a sound-transmitting portion of the amusement structure capable of being placed into contact with the user's mouth; and a signal source operatively associated with the amusement structure and configured to produce signals representative of sound and to transmit the signals tluough the sound-transmitting portion of the amusement structure;

where the sound-transmitting poition can transmit the signals to the user's mouth upon contact of the sound-transmitting portion with the mouth, so that the signals travel from the mouth to the user's ear where they can be perceived by the user as sound;

where signals transmitted from the signal source to the sound-transmitting portion are sufficient to be perceivable by the user as sound when the sound-transmitting portion is in contact with the user's mouth; and where the sound perceivable by the user from the signals produced by the signal source is predominantly from signals transmitted from the sound-transmitting portion through the user's mouth to the user's ear rather than from the signals from the signal source that otherwise may be transmitted to the user's ear.

13. The device of claim 12, where at least a part of the amusement structure comprises a holder for an edible substance.

14. The device of claim 12, where the amusement structure comprises a toy.

15. A device to communicate sound to a user by the transmission of signals through the user's mouth to the user's ear, the device comprising:

a signal source configured to produce signals representative of sound;

an integrated circuit associated with the signal source, where the integrated circuit contains preprogrammed sounds, and is used to produce the signals representative of such sound; and a sound-transmitting element operatively associated with the signal source to which the signal source can transmit signals representative of sound;

where the sound-transmitting element can transmit the signals to the user's mouth upon contact of the element with the mouth, so that the signals travel from the mouth to the user's ear where they can be perceived by the user as sounds;

where signals transmitted from the signal source to the sound-transmitting portion are sufficient to be perceivable by the user as sound when the sound-transmitting portion is in contact with the user's mouth; and where the sound perceivable by the user from the signals produced by the signal source is predominantly from signals transmitted from the sound-transmitting portion through the user's mouth to the user's ear rather than from the signals from the signal source that otherwise may be transmitted to the user's ear.

* * * * *